(12) United States Patent
    Janson

(10) Patent No.:  US 12,642,190 B2
(45) Date of Patent:       Jun. 2, 2026

(54) VARIABLE FORCE COMPOUND CUTTING LOPPER

(71) Applicant: Paul Janson, Porter Ranch, CA (US)

(72) Inventor:  Paul Janson, Porter Ranch, CA (US)

( * ) Notice:   Subject to any disclaimer, the term of this patent is extended or adjusted under 35 U.S.C. 154(b) by 0 days.

(21) Appl. No.: 19/214,620

(22) Filed:    May 21, 2025

(65)            Prior Publication Data

US 2025/0280767 A1      Sep. 11, 2025

Related U.S. Application Data

(63) Continuation-in-part of application No. 18/831,061, filed on May 28, 2024, now abandoned.

(60) Provisional application No. 63/527,199, filed on Jul. 17, 2023.

(51) Int. Cl.
    *A01G 3/02*       (2006.01)
    *A01G 3/025*      (2006.01)

(52) U.S. Cl.
    CPC ..........  *A01G 3/021* (2013.01); *A01G 3/0251* (2013.01)

(58) Field of Classification Search
    CPC .......... A01G 3/02; A01G 3/021; A01G 3/025; A01G 3/0251; B26B 13/00; B26B 13/26; B26B 13/28; B23D 29/02; B23D 29/023
    USPC ............................................ 30/251; D8/4, 5
    See application file for complete search history.

(56)            References Cited

U.S. PATENT DOCUMENTS

| | | | | |
|---|---|---|---|---|
| 107,542 A | * | 9/1870 | Richard .............. | B23D 29/023 |
| | | | | 30/250 |
| 351,339 A | * | 10/1886 | Pullman ................. | B26B 17/02 |
| | | | | 30/192 |
| 564,102 A | * | 7/1896 | Richard ................... | A01G 3/02 |
| | | | | 30/258 |
| 777,567 A | * | 12/1904 | Taylor et al. ........... | A01G 3/02 |
| | | | | 30/239 |
| 832,804 A | | 10/1906 | Oneal | |
| 1,214,635 A | * | 2/1917 | Zimmerman .......... | A01G 3/025 |
| | | | | 30/250 |
| 1,254,284 A | | 1/1918 | Southwood | |
| 1,586,297 A | | 5/1926 | Du | |

(Continued)

FOREIGN PATENT DOCUMENTS

| | | | | | |
|---|---|---|---|---|---|
| CN | | 118176958 A | * | 6/2024 | ............... A01G 3/02 |
| CN | | 120036144 A | * | 5/2025 | ........... A01G 3/0251 |

(Continued)

*Primary Examiner* — Jason Daniel Prone
(74) *Attorney, Agent, or Firm* — Brian S. Steinberger; Hilary F. Steinberger; Steinberger IP Law

(57)            ABSTRACT
Variable force compound gear lopper devices and methods that produce a pinching effect of the handles which comes into play only after the wood, branch, is in the jaws. Once the wood, such as a branch, is in the jaws it causes a countering force which allow the new handle arrangement to cause the frame to rotate slightly on the hook side against the work opposite the cutting blade. So, in effect there is a double compound action against the work. A true double compound pinching effect against the work from both sides of the lopper. With the old version the frame is static and the only action is from the blade side. The variable force lopper has an upper handle; a lower handle connected by a cutting head with upper and lower arms therebetween, with an upper jaw and a lower jaw; and having a slot in the lower arm for the upper jaw.

6 Claims, 8 Drawing Sheets

(56)         References Cited

U.S. PATENT DOCUMENTS

| | | | | |
|---|---|---|---|---|
| 2,384,822 A * | 9/1945 | Drmic | A01G 3/02 | |
| | | | 30/250 | |
| 2,508,790 A * | 5/1950 | Herr | A01G 3/02 | |
| | | | 30/239 | |
| 2,765,688 A | 10/1956 | Evans | | |
| 2,816,359 A | 12/1957 | Benton | | |
| 2,992,576 A | 7/1961 | Evans | | |
| 3,273,238 A * | 9/1966 | Kuhbier | B26B 17/02 | |
| | | | 30/250 | |
| 3,390,455 A | 7/1968 | Florian | | |
| 3,650,028 A * | 3/1972 | La Pointe | A01G 3/0475 | |
| | | | 30/238 | |
| 4,525,929 A * | 7/1985 | Brophy, Sr. | A01G 3/0251 | |
| | | | 30/192 | |
| 5,020,222 A * | 6/1991 | Gosselin | B26B 13/26 | |
| | | | 30/251 | |
| 5,159,757 A * | 11/1992 | Weid | A01G 3/0251 | |
| | | | 30/249 | |
| 5,170,559 A | 12/1992 | Orthey | | |
| D344,219 S * | 2/1994 | Wensley | D8/5 | |
| 5,307,565 A | 5/1994 | Erbrick | | |
| 5,325,591 A | 7/1994 | Orthey | | |
| D356,719 S * | 3/1995 | Choi | D8/5 | |
| 5,511,314 A * | 4/1996 | Huang | A01G 3/0251 | |
| | | | 30/249 | |
| 5,570,510 A | 11/1996 | Linden | | |
| 5,689,888 A | 11/1997 | Linden | | |
| 5,709,030 A * | 1/1998 | Wang | A01G 3/0251 | |
| | | | 30/249 | |
| 5,761,815 A * | 6/1998 | Lin | A01G 3/0251 | |
| | | | 30/140 | |
| 5,771,584 A * | 6/1998 | Wang | B26B 13/26 | |
| | | | 30/190 | |
| 5,809,654 A * | 9/1998 | Huang | A01G 3/0251 | |
| | | | 30/250 | |
| 5,839,195 A * | 11/1998 | Lin | A01G 3/0251 | |
| | | | 30/249 | |
| 5,950,314 A * | 9/1999 | Chang | A01G 3/0251 | |
| | | | 30/244 | |
| 6,345,446 B1 * | 2/2002 | Huang | A01G 3/0251 | |
| | | | 30/192 | |
| 6,408,725 B1 | 6/2002 | Janson | | |
| 6,640,442 B2 * | 11/2003 | Lin | A01G 3/0251 | |
| | | | 30/249 | |
| 6,681,492 B1 * | 1/2004 | Huang | A01G 3/0251 | |
| | | | 30/249 | |
| 6,789,324 B2 | 9/2004 | Linden | | |
| 7,346,991 B1 | 3/2008 | Janson | | |
| 7,444,851 B1 | 11/2008 | Janson | | |
| 8,046,924 B2 | 11/2011 | Block | | |
| 8,572,853 B2 * | 11/2013 | Huang | A01G 3/0251 | |
| | | | 30/239 | |
| 8,613,145 B2 * | 12/2013 | Poole | B26B 17/02 | |
| | | | 30/191 | |
| 8,661,691 B2 * | 3/2014 | Huang | A01G 3/0251 | |
| | | | 30/245 | |
| RE45,488 E * | 4/2015 | Block | A01G 3/0251 | |
| | | | 30/249 | |
| 9,296,116 B2 * | 3/2016 | Descombes | A01G 3/0251 | |
| 9,591,808 B2 * | 3/2017 | Lin | A01G 3/0251 | |
| D813,620 S * | 3/2018 | Janson | D8/5 | |
| 9,918,435 B2 * | 3/2018 | Wang | A01G 3/0251 | |
| 10,212,891 B1 * | 2/2019 | Wu | A01G 3/021 | |
| D847,590 S * | 5/2019 | Janson | D8/5 | |
| 11,540,449 B1 * | 1/2023 | Lin | A01G 3/0251 | |
| 11,968,935 B2 | 4/2024 | Huang | | |
| D1,026,592 S | 5/2024 | Janson | | |
| D1,033,188 S | 7/2024 | Janson | | |
| D1,052,980 S * | 12/2024 | Heine | D8/4 | |
| D1,065,950 S * | 3/2025 | Heine | D8/5 | |
| D1,076,619 S * | 5/2025 | Heine | D8/5 | |
| 12,427,590 B1 * | 9/2025 | Janson | B23D 29/023 | |
| 12,564,139 B1 * | 3/2026 | Janson | A01G 3/0251 | |
| 2006/0026845 A1 * | 2/2006 | Lin | A01G 3/0251 | |
| | | | 30/249 | |
| 2007/0079512 A1 * | 4/2007 | Nelson | A01G 3/0251 | |
| | | | 30/123.3 | |
| 2009/0044412 A1 * | 2/2009 | Hsieh | A01G 3/0251 | |
| | | | 30/356 | |
| 2011/0154668 A1 * | 6/2011 | Liu | A01G 3/0251 | |
| | | | 30/252 | |
| 2016/0345506 A1 | 12/2016 | Lin | | |
| 2022/0304242 A1 | 9/2022 | Heine | | |
| 2022/0312682 A1 * | 10/2022 | Chan | A01G 3/0251 | |
| 2026/0007108 A1 * | 1/2026 | Huang | A01G 3/021 | |

FOREIGN PATENT DOCUMENTS

| | | | | |
|---|---|---|---|---|
| GB | 2643226 A * | 2/2026 | | A01G 3/021 |
| WO | WO-2025227626 A1 * | 11/2025 | | A01G 3/02 |

* cited by examiner

Front

Front

Rear

Exploded

Perspective

Detail Section

Left Side

Front Assembly

Right Side

Partially open

Fully open

Fully open
showing handles

VARIABLE FORCE COMPOUND CUTTING LOPPER

CROSS REFERENCES TO RELATED APPLICATIONS

The present application is a Continuation-In-Part of U.S. patent application Ser. No. 18/831,061 filed May 28, 2024, which claims the benefit of provisional patent application 63/527,199, filed Jul. 17, 2023, by Paul Janson, entitled, "VARIABLE FORCE COMPOUND ACTION CUTTING TOOL WITH ADDITIONAL DOUBLE COMPOUND LEVERAGE". The entire disclosure of each of the applications listed in this paragraph are incorporated herein by specific reference thereto.

BACKGROUND OF THE INVENTION

Field of the Invention

The present invention relates generally to devices for cutting branches, and, in particular, relates to manual devices and methods for cutting, and, in greater particularity, relates to manual devices with a cutting head for holding and cutting large branches.

Description of the Prior Art

Being able to cut large diameter branches from 1 to 2 inches requires the use of sufficient force to do it in one cut. Numerous products are available that attempt this task. Shears are not able to cut such branches since longer handles are required to develop sufficient torque and additional features may also be required.

One device shown is in U.S. Pat. No. 5,020,222 issued Jun. 4, 1991, to Gosselin et al., assigned to Fiskars, entitled: "Variable Force Compound Action Leverage Tool", which is incorporated by reference. These are solely "hand-operated" due to the short handles and are thus limited in the diameter of branches cut. The use of arms, not just the squeezing of the fingers, to operate the cutting device is needed for larger diameter branches as well as having longer handles to transmit the torque from the longer handles to the cutting blades that are pivoted to the handles. It would be impossible to develop such torque by use of fingers and one hand to cut a large diameter branch.

Additional loppers having a "variable force" assigned to Fiskars include: U.S. Pat. Nos. 5,570,510 and 5,689,888 to Linden, which are both incorporated by reference, and U.S. Pat. No. 8,046,924 to Block et al., which is incorporated by reference.

FIG. 1 is a side view of a prior art lopper 13 having two pivots 15 and 17 and a slot 19 of a prior art lopper 13

The subject inventor has invented numerous compound leverage cutting hand tools. See for example, U.S. Pat. Nos. 6,408,725; 7,346,991; and 7,444,851 to Janson, which are all incorporated by reference in their entirety.

Accordingly, there is a need for a compound gear lopper having additional cutting forces available.

SUMMARY OF THE INVENTION

A primary objective of the variable force compound action cutting lopper with additional double compound levers provides additional cutting force to shear large diameter branches.

The variable force compound lopper that produces a pinching effect of the handle which comes into play only after the wood, branch, is in the jaws. Once the wood is in the jaw it causes a countering force which allow the new handle arrangement to cause the frame to rotate slightly on the hook side of the jaws against the work opposite the cutting blade. So, in effect you have a double compound action against the work. A true double compound pinching effect against the work from both sides of the lopper. With The old version the frame is static and the only action is from the blade side. The present invention thus comprises: an upper rotating cutting blade being convex connected into a slotted arm in the lower handle arm, and connected to a pivot on the rotating lower blade, the slotted arm connected into a lower handle arm and to a central pivot; the lower rotating cutting blade connected to an upper handle arm, to the central pivot and also pivoted to the upper cutting blade, and the upper handle arm connected to the lower rotating cutting blade at the central pivot and to the handle upper arm and to the upper rotating cutting blade at another pivot.

It is another object of the present invention to provide a lopper for cutting large branches by the use of a variable force compound action cutting tool with additional double compound leverage;

It is still another object of the present invention to provide a lopper where the applied force is multiplied by use of force multiplying connecting arms and levers;

It is a further object of the present invention to provide a lopper having no gear sections;

It is still a further object of the present invention to provide lopper than can easily cut approximately 2-inch-wide branches;

It is still another object of the present invention to provide a lopper that is easily manufactured; and It is still another object of the present invention to provide a lopper that is comparable in price to non-compound gear loppers.

These and other objects, features, and advantages of the present invention will become more readily apparent from the attached drawings and the detailed description of the preferred embodiments, which follow.

BRIEF DESCRIPTION OF THE DRAWINGS

Like reference numerals refer to like parts throughout the several views of the drawings.

DETAILED DESCRIPTION OF THE PREFERRED EMBODIMENTS

Figures 1, 2:
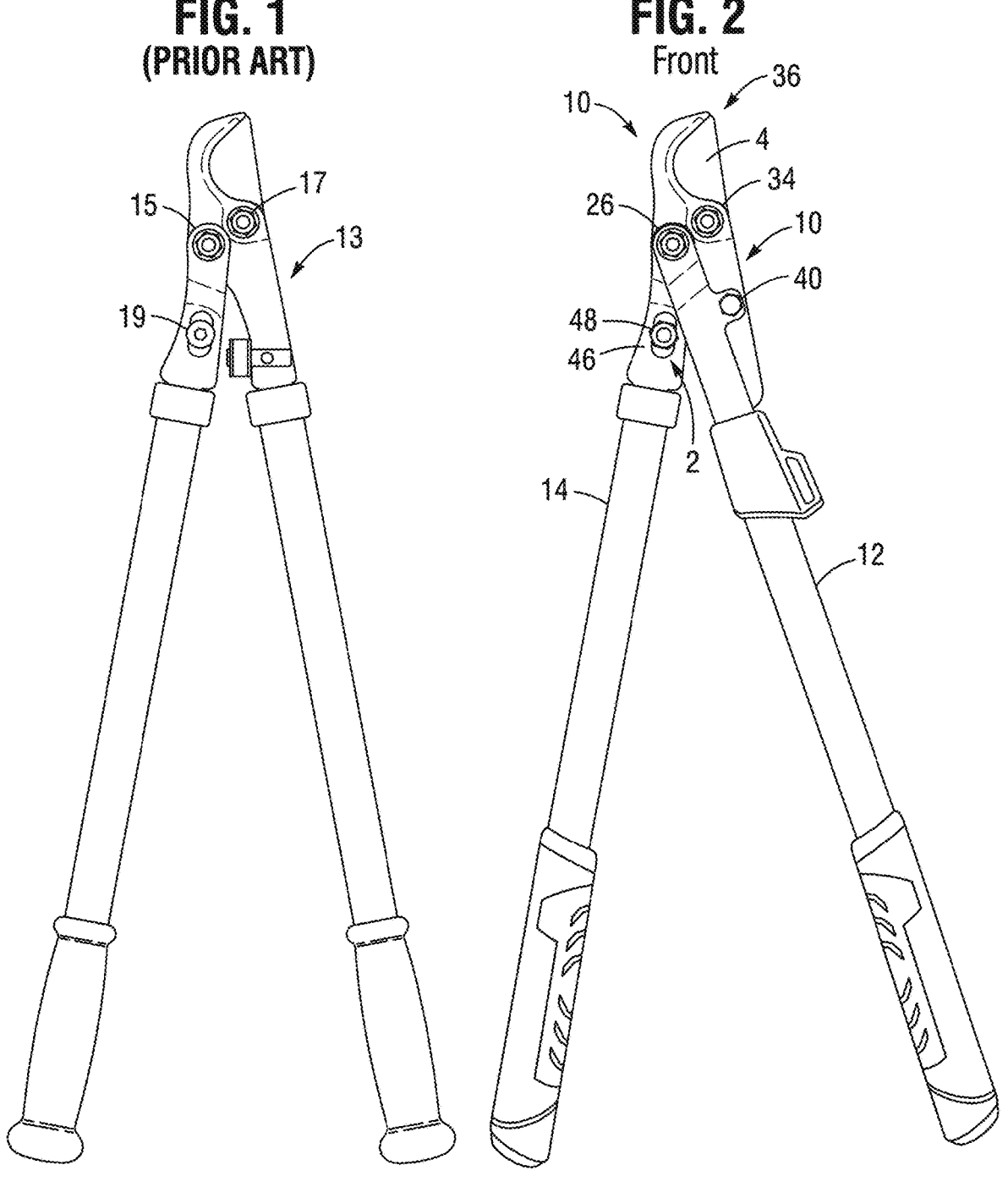
FIG. 1 is a side view of a lopper having two pivots and a slot of a prior art lopper.
FIG. 2 is a front upright position, of the present invention lopper showing three pivots and a slotted connector in a closed position.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

The variable force compound cutting lopper provides additional cutting force by means of compound levers that are uniquely oriented thereon. A listing of the components is now described.

1 upper arm (first arm) having a P portion attached to upper handle 12

2 second arm with slotted connector 48 attached to lower handle 14

3 lower cutting jaw with concave curve hook cutting edge (hooked structure) 24

4 upper cutting jaw with convex curve cutting edge 32

10 variable force lopper 12 upper handle/first handle 13 lopper (prior art)

14 lower handle/second handle 15 pivot (prior art)

17 pivot (prior art)

19 slot (prior art)

20 connection between second arm 2 and lower handle/second handle 14

22 arm tabs 24 concave cutting edge (hooked structure) having a C-shaped cutting edge on lower cutting jaw 3

26 central pivot (common pivot point)

28 flat head bolt 32 convex curved cutting edge on upper cutting jaw 4

34 upper pivot (cutting blade pivot point)

36 cutting head 38 rear section arm 40 bolt 42 end 44 other end 46 lower pivot with slotted connector 48

48 slotted connector 50 partially open angle 60 fully open angle 72 bolt 73 through-hole in P portion of arm 1

75 through-hole in lower portion of lower cutting jaw 3

76 nut for bolt 72

82 bolt 83 through-hole in midportion of upper jaw 4

85 side through-hole in midportion of lower jaw 3.

86 combination of nut and washer 92 lower bolt 93 through-hole in endportion of cutting jaw 4

94 nut 103 a central through-hole in a midportion of lower cutting jaw 3

105 outer through-hole in second arm 2

107 outer through-hole in upper arm 1

108 combination of a nut and washer;

FIG. 1 is a side view of a lopper 13 having two pivots 15 and 17 and a slot 19 of a prior art lopper 13; FIG. 2 is a front view of the present invention 10 showing three pivots: a central pivot 26, an upper pivot 34, a lower pivot 46 sliding in a slotted connector 48 in a closed position.

Figures 3, 4:
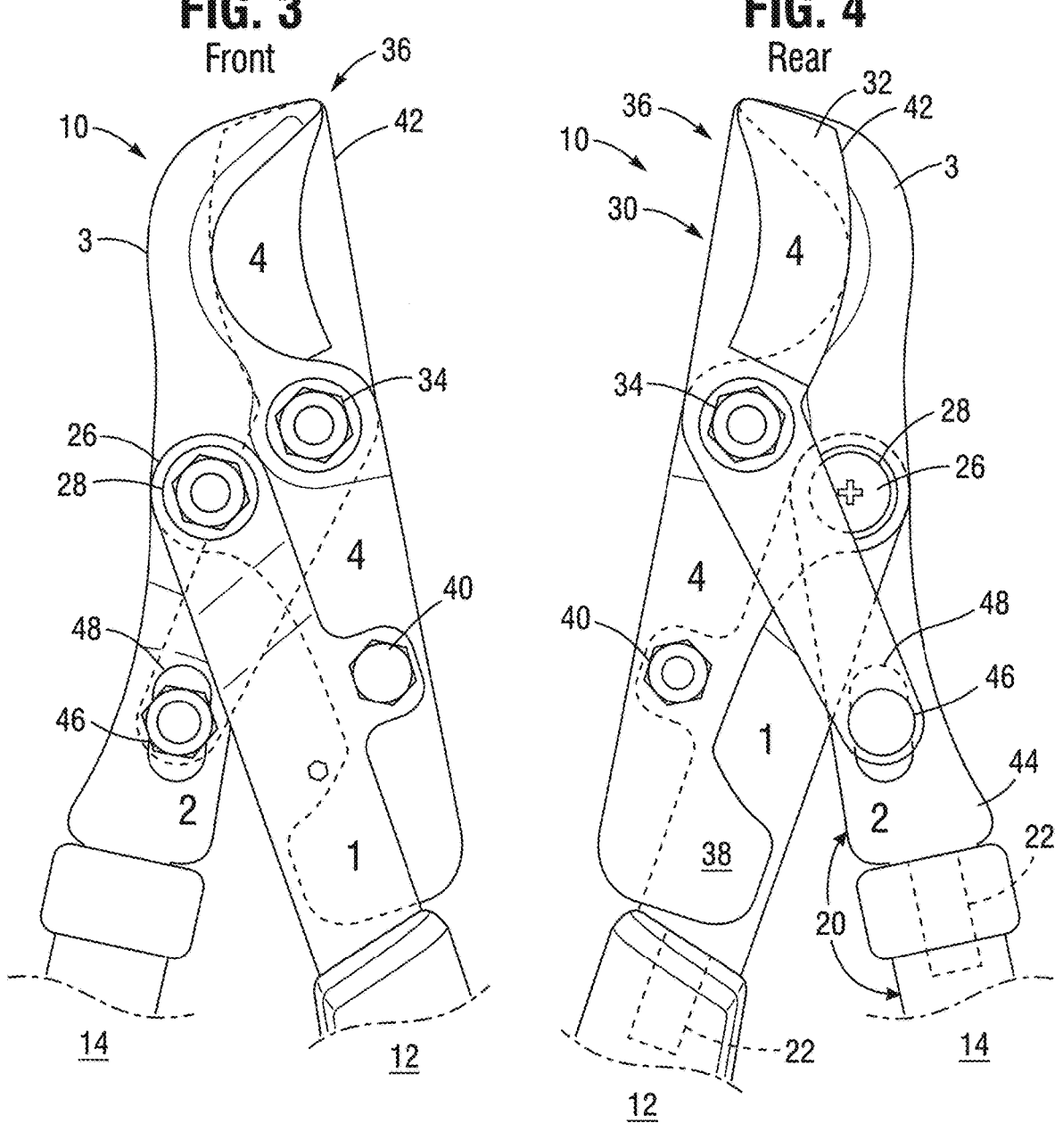
FIG. 3 is an enlarged front view of the lopper head, of FIG. 2 in a closed position having three pivots and two arms and two cutting blades.
FIG. 4 is an enlarged rear view, of FIG. 3 showing the position of the rotating cutting blades in the handles partially shown.

FIG. 3 is an enlarged front view of the cutting head 36. FIG. 4 is an enlarged rear view of the cutting head 36 in FIG. 3.

Figure 5:
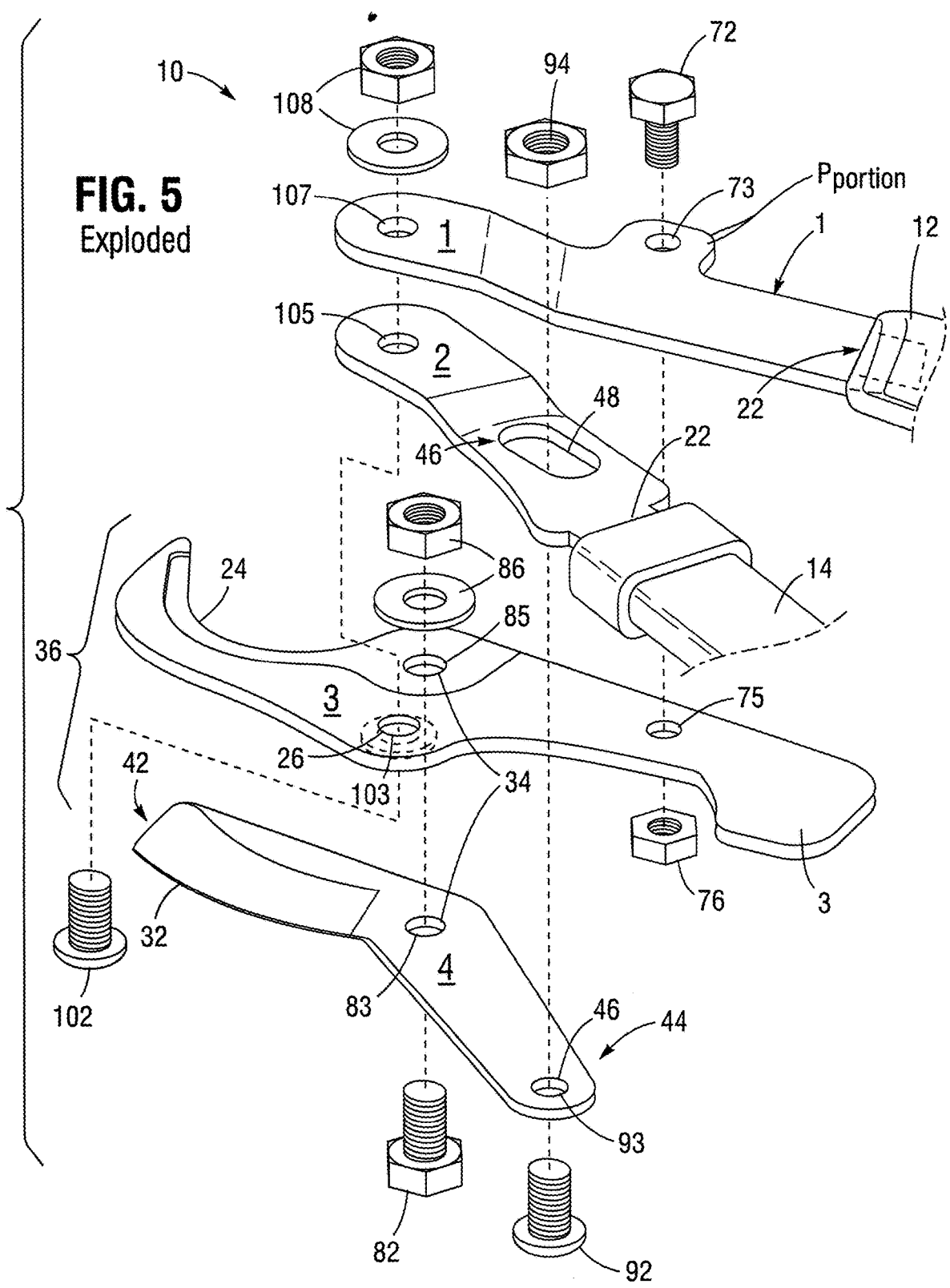
FIG. 5 is an exploded view of the upper arm, second arm, lower cutting jaw and upper cutting jaw of FIGS. 2-4 4 of the present invention showing their relative positions with nuts and bolts of the upper pivot, lower pivot, and central pivot (common pivot point)

FIG. 5 shows an exploded perspective view of the number pieces of the cutting head 36. Item 4 is the upper cutting jaw with convex curve cutting edge 32, 3 is a lower cutting jaw with concave cutting edge (hooked structure) 24, Item 2 is second arm with slotted connector 48 attached to lower handle 14 and item 1 is upper arm having a P portion attached to upper handle 12.

A bolt 72 passes into through-hole 73 of upper arm 1 having a P portion, and into through-hole 75 in lower portion of lower cutting jaw 3 fastened with nut 76 so that upper arm 1 remains fixed to lower cutting jaw 3.

The upper pivot 34 is formed by a bolt 82 which passes through a through-hole 83 in midportion of upper cutting jaw 4 and through a side through-hole 85 in a midportion of lower cutting jaw 3 and held in a pivot arrangement by a combination 86 of a bolt and washer.

An upper arm 1 having a P portion with an extended end having an end through-hole 107, a through-hole 73 through the P portion, and an opposite end attached to the upper handle 12.

A second arm 2 having a distal flat plate end with a through-hole 105, bend to a middle plate with the slotted connector 48 and a proximate end attached to the lower handle 14. Arm tab 22 connect upper arm 1 to upper handle 12. Arm tab 22 connects second arm 2 to lower handle 14.

A bolt 72 passes into through-hole 73 of upper arm 1 having a P portion and into through-hole 75 in lower portion of lower cutting jaw 3 fastened with nut 76 so that P upper arm 1 remains fixed to lower cutting jaw 3.

The lower pivot 46 is formed by a lower bolt 92 which passes into through-hole 93 in end portion of upper cutting jaw 4, and through slotted connector 48 of second arm 2, and fastened to nut 94.

The central pivot (common pivot point) 26 formed by a bolt 102 that passes through a central through-hole 103 in a midportion of lower cutting jaw 3, into an outer through-hole 105 in second arm 2, out through-hole 107 in upper arm 1, and attached to a combination 108 of a nut and washer.

Figure 6:
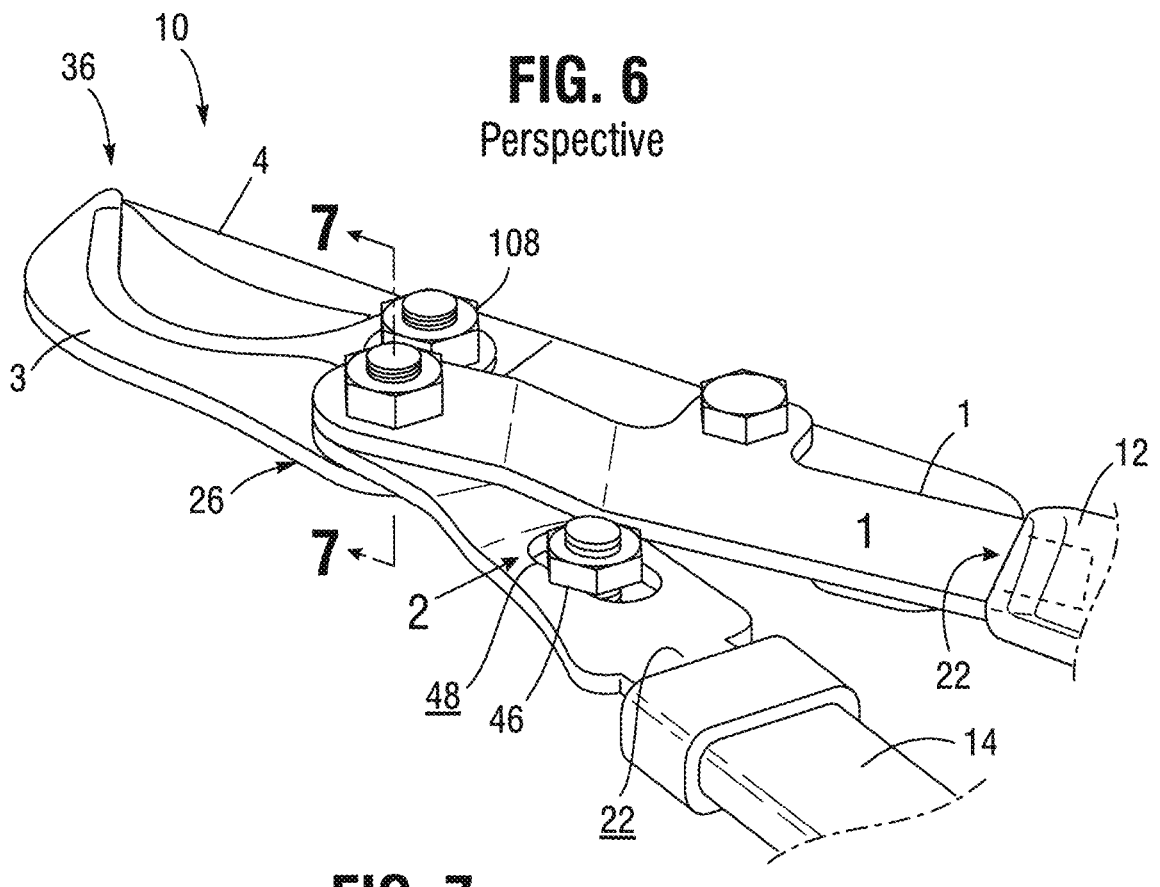
FIG. 6 is a perspective assembled view of the lopper components of FIG. 5.
Figures 8, 9, 10:
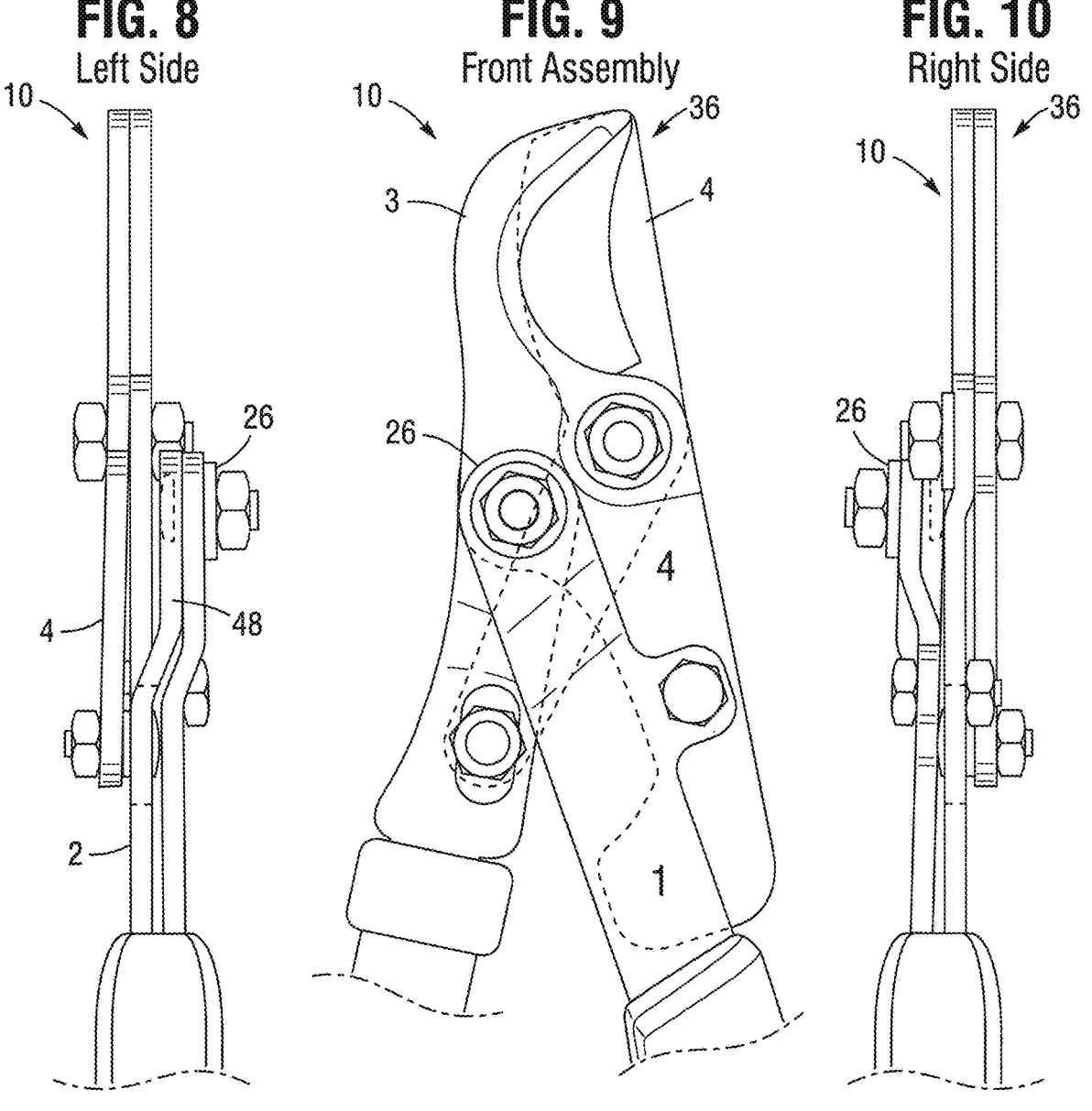
FIG. 8 is a left side view of the assembled lopper of FIG. 6.
FIG. 9 is front view of the cutting head front assembly.
FIG. 10 is a right side view of the cutting head of the assembled lopper components of FIG. 6.

Further, FIG. 8 show a left side view of the variable force lopper 10 in a closed position. FIG. 10 shows a right view of the variable force lopper 10 in a closed position. Referring to FIG. 6, an upper handle 12 and a lower handle 14 are partially shown. A cutting head 36 is therebetween. An upper arm 1 and a second arm 2 includes slotted connector 48 are connected thereto by inserting arm tabs 22 shown in FIG. 6 into upper handle 12 and lower handle 14.

Referring to FIG. 5, an upper pivot 34 34 allows the upper cutting jaw 4 to rotate freely thereon. The upper cutting jaw 4 has a convex curved cutting edge 32 facing downward into the lower cutting jaw 3 with concave curved cutting edge (hooked structure) that is semi-circular shaped to hold a cutting piece partially open in FIG. 11. The lower cutting jaw 3 being one piece that pivots on the central pivot (common pivot point) 26. The lower cutting jaw 3 has a concave cutting edge (hooked structure) 24.

The upper cutting jaw 4 has a convex curved cutting edge 32 on one end 42 and on the other end 44 a lower pivot 46 that slides in a slotted connector 48, but is located on the second arm 2.

The upper arm 1 is also attached to the central pivot (common pivot point) 26. The second arm 2 is also attached to the central pivot (common pivot point) 26, FIG. 5.

Figure 7:
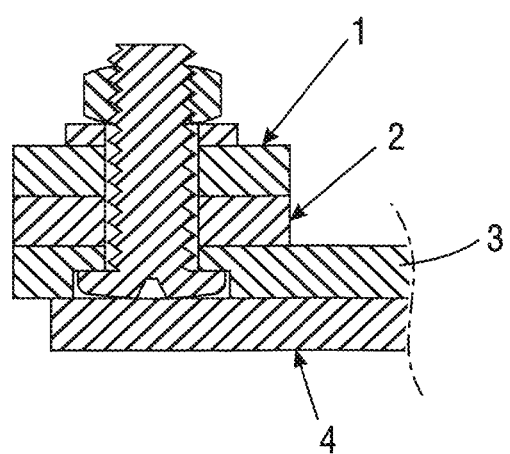
FIG. 7 is the cross sectional view of FIG. 6.

FIG. 6 shows a perspective assembled view 10 of the lopper components of FIG. 5;

FIG. 7 is the cross-sectional view of FIG. 6;

FIG. 8 is a left side view of the assembled lopper 10 of FIG. 6;

FIG. 9 is a front enlarged view of the cutting head 36 of FIG. 6.

Figure 11:
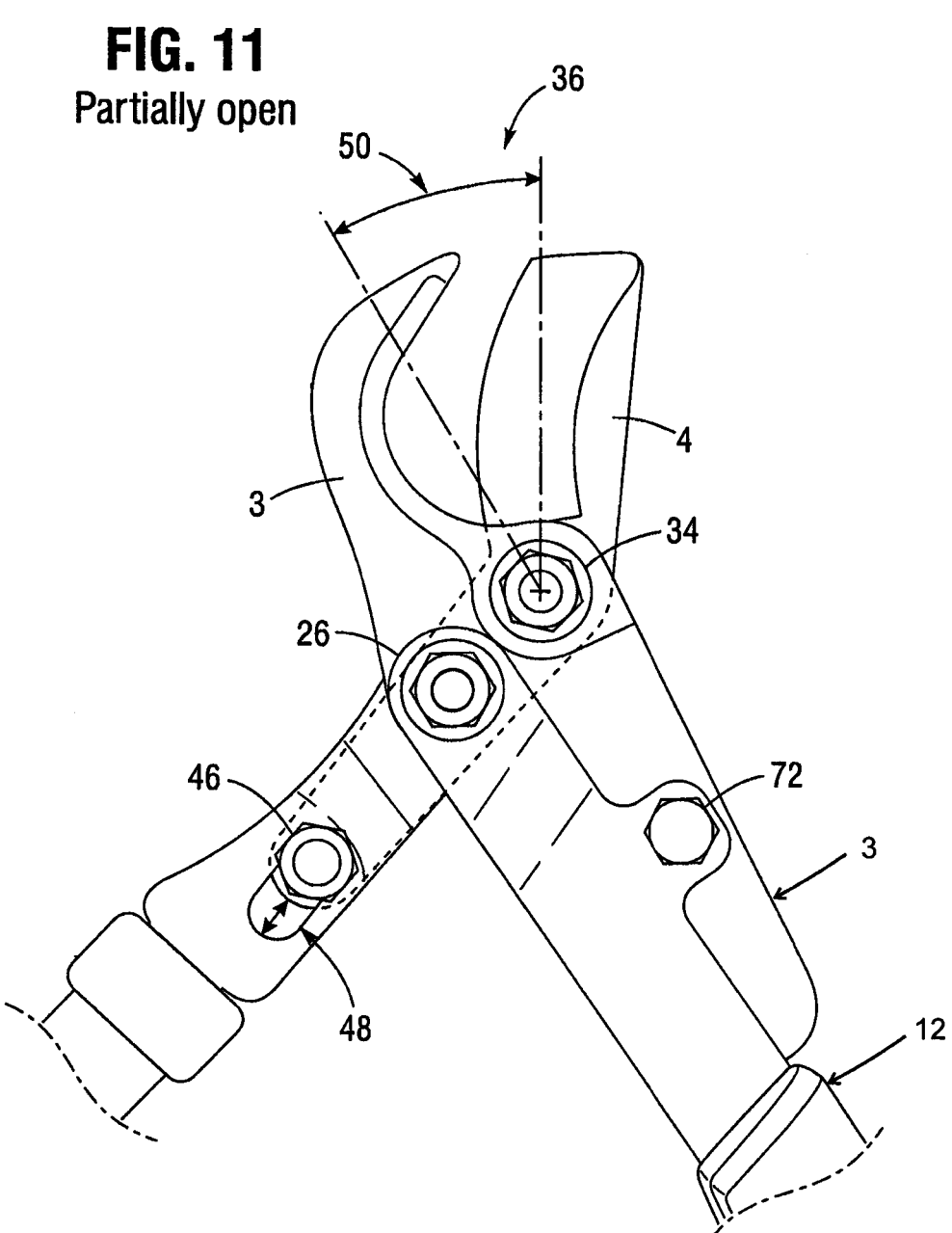
FIG. 11 is a front view of the cutting head in a partially open position.
Figure 12:
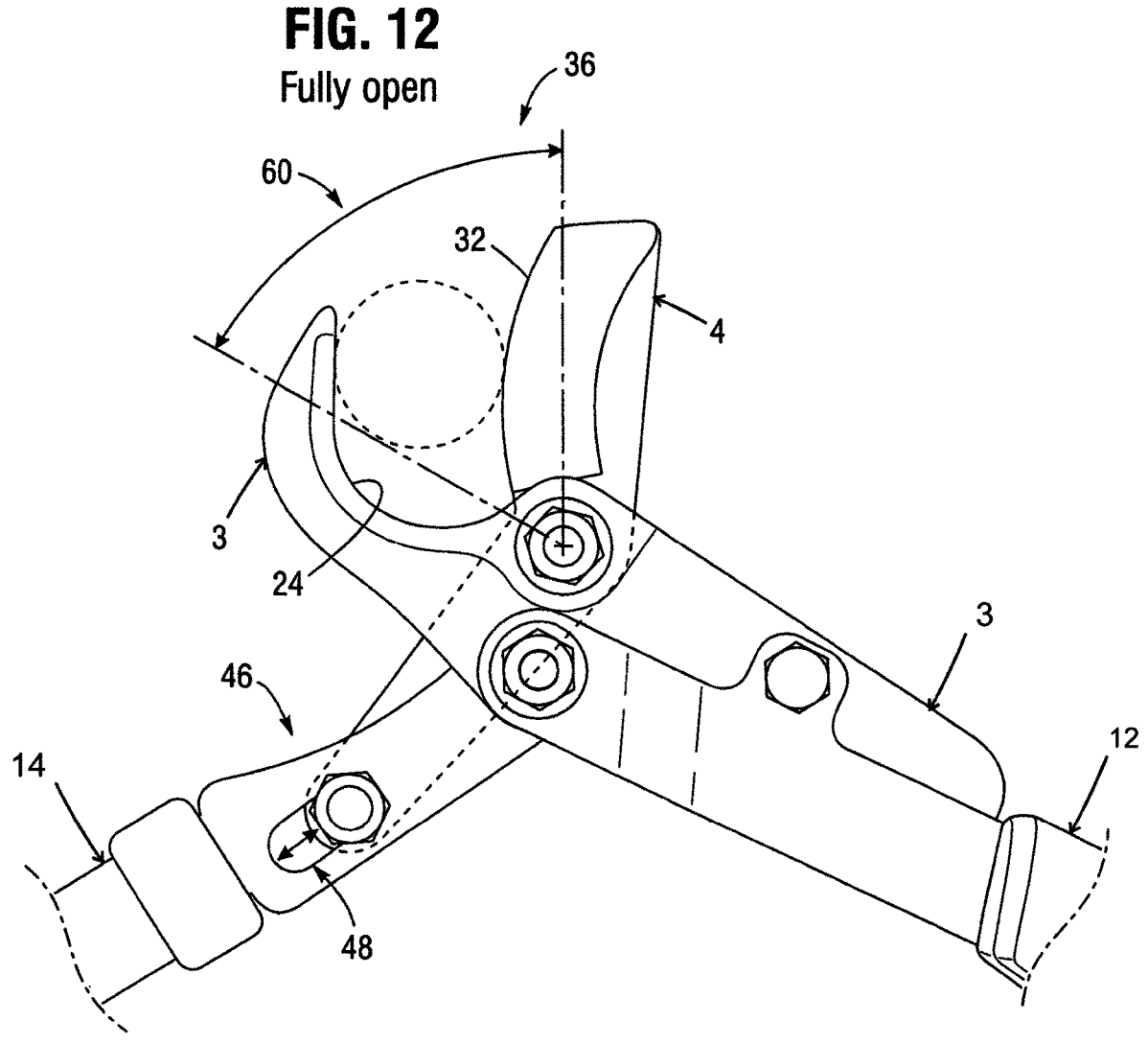
FIG. 12 is another view of FIG. 11 but being fully open and further with a large branch therein.
Figure 13:
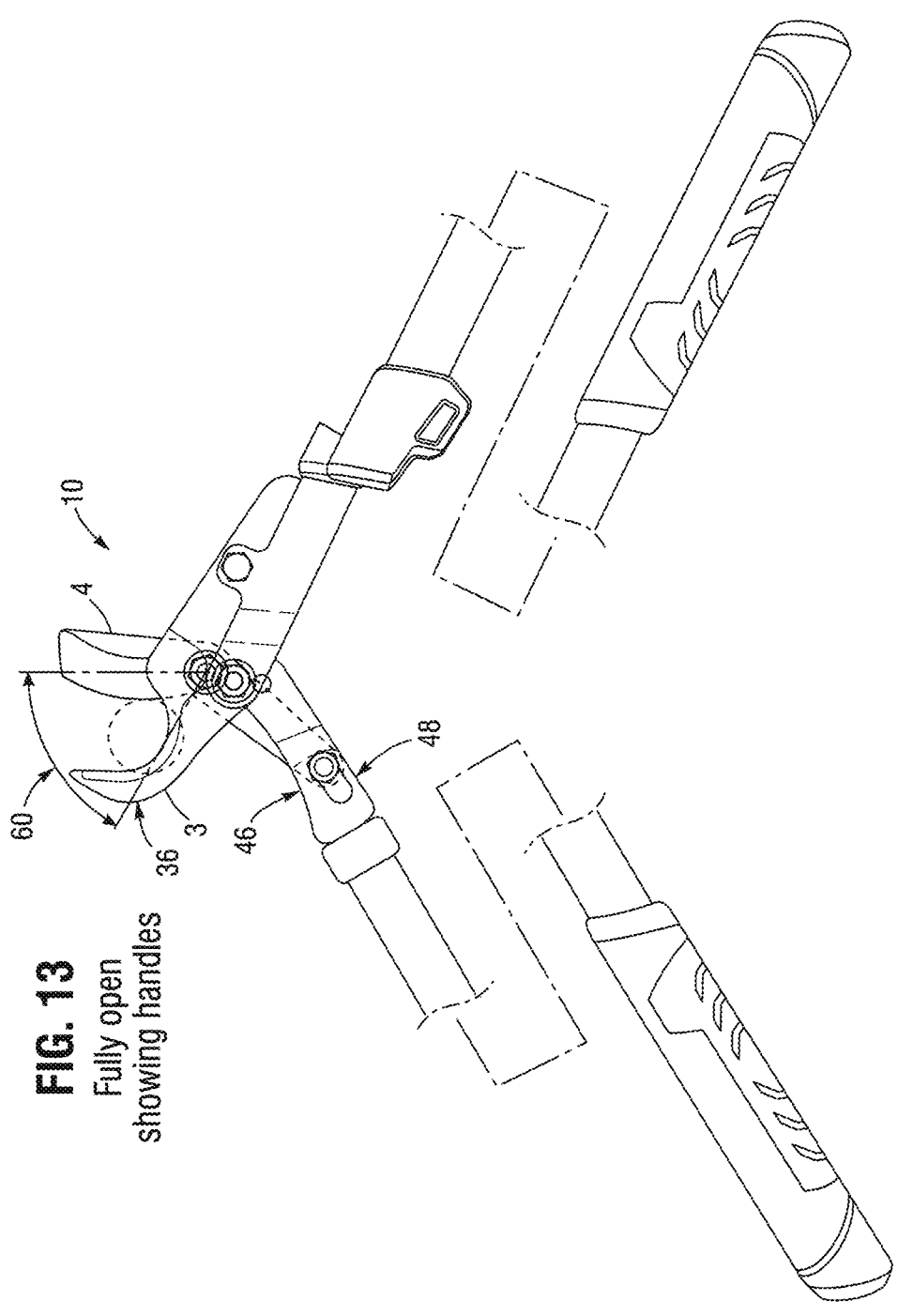
FIG. 13 is another view of FIG. 12, but with the handles partially shown.

FIG. 10 is a right side view of the assembled lopper 10 of FIG. 6;

FIG. 11 is a front view of the cutting head in a partially open position with a branch therein; and FIG. 12 is the same view of FIG. 11 but being fully open and further with a large branch therein;

FIG. 13 is the same as FIG. 12, but with the handles partially shown.

In summary, a variable force compound cutting lopper 10 comprises an upper handle 12; a lower handle 14, said upper handle 12 and said lower handle 14 being connected by means of a cutting head 36; said cutting head 36, said upper and said lower handles 12, 14 attached to said cutting head 36 by an upper arm 1 and second arm 2, where said cutting head 36, said cutting head includes a lower cutting jaw 3 and an upper cutting jaw 4 pivotally connected at a central pivot (common pivot point) 26, said upper cutting jaw 4 is rotatably attached by a central pivot (common pivot point) 26 to a lower cutting jaw 3, and also rotatably attached to a slotted connector 48 in a lower pivot 46 in said lower second arm 2 with a slotted connector 48.

The variable force compound cutting lopper 10 as noted above has said lower cutting jaw 3 shown in FIG. 12 with concave cutting edge (hooked structure) 24 that closely engages to the upper cutting jaw 4 with convex curved cutting edge 32 and is capable of holding an appropriately sized branch therein. Referring to FIGS. 2, 5, 11 and 12, the variable force compound lopper 10 as noted above wherein said upper arm 1 is connected to said lower cutting jaw 3 at a second point 75 arrears of the cutting blade upper pivot point 34 wherein said upper handle 12 and said lower handle 14 are connected at a central pivot (common pivot point) 26 with said upper handle 12 being connected at a second connection point 75 arrears of the cutting blade upper pivot point 34 allowing said upper handle 12 to exert a leverage on the lower cutting jaw 3 where the central pivot (common pivot point) with lower handle 14 is a fulcrum to exert a rotational force on the lower cutting jaw 3 when work is placed between the cutting blades 24, 32 and the hooked lower cutting jaw 3.

The variable force compound cutting lopper 10 as noted above has said upper and said lower handles 12, 14 being elongated handles and have a length of approximately 20 to approximately 30 inches and are adjustable in length by arm tabs 22 referenced in FIG. 4 and FIG. 5 which allows above and below attached parts to adjust in length. The variable force compound cutting lopper 10 as noted above wherein said slotted connector 48 shown in FIG. 5 is approximately one half inch wide and one inch long oppositely located from said central pivot (common pivot point) 26.

Referring to FIGS. 2, 5, 11 and 12, a variable force double compound cutting lopper 10 comprises an upper and lower cutting jaws 4, 3, where said upper cutting jaw 4 includes an upper cutting blade with a convex curved cutting edge 32 and said lower cutting jaw 3 includes a concave cutting edge (hooked structure) where convex curved cutting edge 32 on upper cutting jaw 4 bypasses through concave cutting edge (hooked structure) 24 on lower cutting jaw 3, the convex curved cutting edge on upper cutting jaw 4 is pivotally attached to said lower cutting jaw 3 at a upper pivot 34 and with two handles 12 and 14, an upper handle 12 and lower handle 14 are pivotally attached to lower hooked jaw 3 at a central pivot (common pivot point) 26, where lower handle 14 is pivotally attached to second arm 2 by means of a slotted connector 48; said upper arm 1 being connected at another point to said lower cutting jaw 3 at a point 75 behind the upper pivot (cutting blade pivot point) 34. The variable force double compound lopper 10 as described above wherein when work such as a branch is placed in the upper and lower cutting jaws 4, 3 the action of both handles 12, 14 sharing a a central pivot (common pivot point) 26 behind the upper pivot (cutting blade pivot point) 34 creates a double compound force causing, the hooked portion (concave cutting edge (hooked structure) 24 of said lower cutting jaw 3 to rotate around the central pivot (common pivot point) 26 into the work with extreme force against the cutting blade edge 32. The variable force double compound lopper 10 as noted above wherein said upper handle 12 is connected at a central pivot (common pivot point) 26 with said lower handle 14 and said upper handle 12 is connected to a second point 75 on the lower cutting jaw 3 arrears of said upper pivot (cutting blade pivot point) 34, wherein said upper handle 12 being connected at a central pivot (common pivot point) 26 with the lower handle 14 and at a second point 75 on the lower cutting jaw 3 arrears of the upper pivot (cutting blade pivot point) 85, where said upper handle's central pivot (common pivot point) 26 acts as a fulcrum against said second handle's connection point 75 to the lower cutting jaw 3 arrears of the upper pivot (cutting blade pivot point) 34, wherein a double compound cutting action is exerted against the lower cutting jaw 3 to cause it to rotate around the lower and upper handle 14, 12 central pivot (common pivot point) 26.

The term "approximately"/"approximate"/"about" can be +/−10% of the amount referenced. Additionally, preferred amounts and ranges can include the amounts and ranges referenced without the prefix of being approximately.

Although specific advantages have been enumerated above, various embodiments may include some, none, or all of the enumerated advantages.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

Since many modifications, variations, and changes in detail can be made to the described embodiments of the invention, it is intended that all matters in the foregoing description and shown in the accompanying drawings be interpreted as illustrative and not in a limiting sense. Thus, the scope of the invention should be determined by the appended claims and their legal equivalents.

The invention claimed is:

1. A variable force compound cutting lopper, said variable force compound cutting lopper comprising:
   a cutting head 36 that includes an first cutting jaw 4 and a second cutting jaw 3 that are pivotally attached to each other at a common pivot point 26;
   the first cutting jaw 4 includes an elongated plate member having a convex curved cutting edge 32 at one end, a middle through-hole 83, and an opposite end with a through hole 93;
   the second cutting jaw 3 includes another elongated plate member having a concave cutting edge 24 at one end, side by side middle through-holes 85, 103, an opposite end, and a third through-hole 75 between the middle through-holes 85, 103 and the opposite end;
   a first handle 12 with a first arm 1;
   a second handle 14 with a second arm 2;
   said first cutting jaw 4 and said second cutting jaw 3 is rotational about the common pivot point 26 axis when work is placed in said first cutting jaw 4 and said second cutting jaw 3;
   said first arm 1 having a P portion with an extended end with through-hole 107, a through-hole 73 through the P portion, and an opposite end attached to the first handle 12;
   the second arm 2 having a distal flat plate end with a through-hole 105 that bends to a middle plate with a slotted connector 48 and a proximate end attached to the second handle 14,
   a bolt 72 passes into the through-hole 73 of the P portion of said first arm 1 and into the third through-hole 75 in a portion of second cutting jaw 3 fastened with nut 76 so that the first arm 1 remains fixed to the second cutting jaw 3
   a first pivot 34 formed by a first bolt 82 which passes through the middle through-hole 83 in the first cutting jaw 4 and through the middle through-hole 85 in the second jaw 3 and fastened to a nut and washer 86;
   a second pivot 46 formed by a second bolt 92 which passes into the through-hole 93 in the first cutting jaw 4, and through the slotted connector 48 of said second arm 2, and fastened to nut 94;
   said common pivot point 26 formed by a bolt 102 that passes through the middle through-hole 103 in the second cutting jaw 3, into the through-hole 105 in the second arm 2, out the through-hole 107 in the first arm 1, and fastened to a nut and washer 108; and
   wherein the lopper produces a pinching effect of the first handle 12 and the said handle 14 which comes into play only after wood is placed between the first cutting jaw 4 and the second cutting jaw 3, the placed wood causes a countering force which allow the first handle 12 and the second handle 14 to cause the concave cutting edge 24 of the second cutting jaw 3 to work opposite against the convex cutting edge 32 of the first cutting jaw 4, forming a double compound action against the wood.

2. The variable force compound cutting lopper as in claim 1, wherein said slotted connector 48 is approximately one half inch wide and approximately one inch long oppositely located from said common pivot point 26.

3. A variable force compound cutting lopper, said variable force compound cutting lopper comprising:
   a first cutting jaw 4 with a convex cutting edge 32;
   a second cutting jaw 3 with a concave cutting edge 24, the first cutting jaw 4 and the second cutting jaw 3 forming a cutting head 36;
   a first handle 12 with a first arm 1;
   a second handle 14 with a second arm 2 having a slotted connector 48;
   a first pivot 34 formed by first bolt 82 which passes through a middle though-hole 83 in a midportion of the first cutting jaw 4 and through side through-hole 85 in a midportion of the second cutting jaw 3 and fastened to a nut and washer 86;
   a second pivot 46 formed by a second bolt 92 which passes into though-hole 93 in an end portion of the first cutting jaw 4, and through the slotted connector 48 of the second arm 2, and fastened to nut 94;
   a common pivot point 26 formed by a bolt 102 that passes through a central through-hole 103 in a midportion of the second cutting jaw 3, into an outer through-hole 105 in the second arm 2, out a through-hole 107 in the first arm 1, and fastened to a nut and washer 108; and
   wherein the lopper produces a pinching effect of the first handle 12 and the second handle 14 which comes into play only after wood is placed between the first cutting jaw 4 and the cutting jaw 3, the placed wood causes a countering force which allow the first handle 12 and the second handle 14 to cause the concave cutting edge 24 of the second cutting jaw 3 to work opposite against the convex cutting edge 32 of the first cutting jaw 4, forming a double compound action against the wood.

4. The variable force compound cutting lopper as in claim 3, wherein said slotted connector 48 is approximately one half inch wide and approximately one inch long oppositely located from said common pivot point 26.

5. A method of forming a pinching effect with a variable force compound cutting lopper, comprising the steps of:
   providing a first cutting jaw 4 with a convex cutting edge 32;
   providing a second cutting jaw 3 with a concave cutting edge 24, and the first cutting jaw 3 and the second cutting jaw 4 form a cutting head 36;

providing a first handle 12 with a first arm 1;

providing a second handle 14 with a second arm 2 having a slotted connector 48;

forming a first pivot 34 formed by first bolt 82 which passes through a middle though-hole 83 in a midportion of the first cutting jaw 4 and through side through-hole 85 in a midportion of the second cutting jaw 3 and fastened to a nut and washer 86;

forming a second pivot 46 formed by a second bolt 92 which passes into though-hole 93 in an end portion of the first cutting jaw 4, and through the slotted connector 48 of the second arm 2, and fastened to nut 94;

forming a common pivot point 26 formed by a bolt 102 that passes through a central through-hole 103 in a midportion of the second cutting jaw 3, into an outer through-hole 105 in the second arm 2, out a through-hole 107 in the first arm 1, and fastened to a nut and washer 108; and producing a pinching effect in the lopper by the first handle 12 and the second handle 14 which comes into play only after wood is placed between the first cutting jaw 4 and the second cutting jaw 3, the placed wood causes a countering force which allow the first handle 12 and the second handle 14 to cause the concave cutting edge 24 of the second cutting jaw 3 to work opposite against the convex cutting edge 32 of the first cutting jaw 4, forming a double compound action against the wood.

6. The method in claim 5, wherein said slotted connector 48 is approximately one half inch wide and approximately one inch long oppositely located from said common pivot point 26.

* * * * *